Feb. 24, 1953     G. C. J. LEGG ET AL     2,629,282
APPARATUS FOR USE IN THE PRODUCTION OF PLATE
GAUGES OR OTHER PLATELIKE ELEMENTS HAVING
A PREDETERMINED EDGE CONTOUR
Filed Sept. 1, 1950
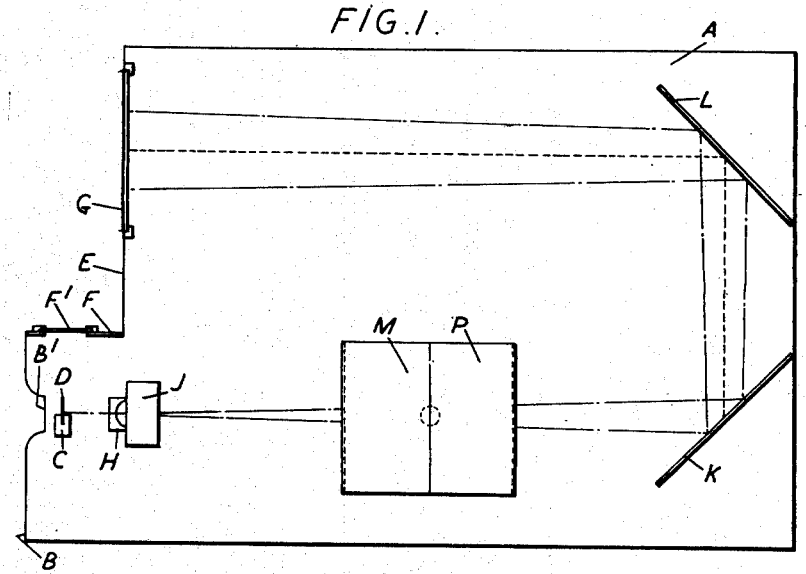
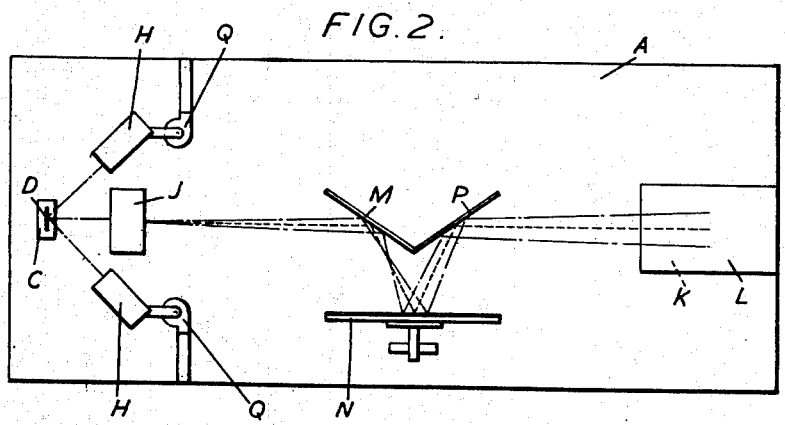
Inventor
GEORGE C. J. LEGG
WILLIAM C. H. CROOK
By Emery Holcombe & Blair
Attorneys Patented Feb. 24, 1953

2,629,282

UNITED STATES PATENT OFFICE 2,629,282

APPARATUS FOR USE IN THE PRODUCTION OF PLATE GAUGES OR OTHER PLATELIKE ELEMENTS HAVING A PREDETERMINED EDGE CONTOUR

George Charles James Legg, Brentford, and William Charles Herbert Crook, Hounslow, England, assignors to D. Napier & Son Limited, London, England, a British company Application September 1, 1950, Serial No. 182,722
In Great Britain September 2, 1949

2 Claims. (Cl. 88—14)

This invention relates to apparatus for use in the production of plate gauges and other plate-like parts having a predetermined edge contour and is particularly but not exclusively applicable to the production of such plate-like parts by hand methods, that is to say by the use of hand shaping or cutting tools such as files or stones, although it may also be applied to apparatus in which shaping or cutting tools are power-operated under manual control.

The object of the invention is to provide a form of apparatus which will facilitate the production of such plate-like parts, which for convenience will hereinafter be referred to as plate gauges, accurately to a drawing which, in most cases, will be a drawing on a much enlarged scale showing the desired contour to which the gauge is to be cut.

According to the present invention apparatus for use in shaping a plate-like blank to a predetermined edge contour, for example for use as a plate gauge, comprises a support for supporting the blank in a position where it is readily accessible to a hand-controlled shaping tool, a support for a drawing of the desired contour on an enlarged scale situated where an operator can readily view it while shaping the part with the shaping tool, and episcopic projection apparatus including means for highly illuminating one side of the blank, and an optical system for projecting on to the drawing an image of the blank magnified to correspond with the drawing and superimposed thereon to enable the actual contour to be continuously compared with the desired contour.

Where, as will usually be the case, the support for the plate-like element is arranged within a compartment where it is readily accessible to hand-operated tools, means are preferably provided for producing a current of cooling air to carry away the heat generated by the illuminating means.

The projection system will normally include a number of mirrors or the equivalent and, in addition to a focussing device, may include means, such for example as mechanism for moving one or more of the mirrors, to vary the total distance of projection from the lens system to the screen, whereby the degree of enlargement of the projection system can be adjusted within limits.

The general layout of the apparatus may vary but in a convenient arrangement the support for the plate-like part is situated below and somewhat in front of the transparent support for the drawing so as to be somewhat nearer to the operator than is the support for the drawing, and the projection apparatus comprises illuminating means for the face of the plate-like part remote from the operator, a lens system including focussing mechanism situated on the side of the support remote from the operator, and a system of mirrors on the side of the lens system remote from the operator by which the projection of the image of the blank through the lens system is transmitted on to the face of the drawing on the drawing support remote from the operator, the drawing acting as a translucent screen on to the back of which the image is thus projected so that the operator sees such image superimposed upon the drawing of the correct profile on the front of the drawing.

The invention may be carried into practice in various ways but one specific embodiment will be described by way of example with reference to the accompanying drawings, in which Figure 1 is a diagrammatic elevation of an arrangement for use in the production of plate gauges, and Figure 2 is a plan view of the system of Figure 1.

The apparatus shown comprises a housing A in the front wall B of which is an aperture $B^1$ at a level convenient for the insertion of an operator's hands when using a hand shaping tool such as a file or stone. Immediately inside the aperture is a support C for a plate-like blank D from which a plate gauge is to be formed, the support being adapted to support the plate-like blank in a vertical plane and preferably in a readily adjustable manner.

The front wall of the housing above the aperture is stepped back somewhat at E so that there is a horizontal wall F immediately above the support for the blank, and a window $F^1$ is provided in this wall through which the operator can view the blank while he is working on it. Mounted in the upper vertical wall E so as to be conveniently visible to the operator as he works is a transparent screen G to the face of which can be secured, as by adhesive or otherwise, a drawing showing on an enlarged scale the profile to which the plate-like blank is to be shaped.

Arranged within the housing somewhat behind and to opposite sides of the support C for the blank are two high power illuminating lamps H of mercury-vapour discharge type, the light from which is directed on to the rear face of the blank so that it is highly illuminated.

Situated between the illuminating lamps H is a projection lens system J for projecting an enlarged image of the blank thus illuminated. The optical system includes a series of mirrors by which an enlarged image of the edge of the blank is projected on to the back of the drawing on the screen G, the magnification corresponding to that of the drawing so that the actual contour of the blank can be continuously compared with the desired contour.

The mirror system may vary but conveniently comprises two mirrors K and L at the rear of the housing, both normal to the vertical plane of Figure 1 and inclined at 45° from the horizontal in opposite directions so that the lower mirror K reflects the rays from a horizontal backward direction to a vertical upward direction, whilst the upper mirror L reflects them from a vertical upward direction to a horizontal forward direction, that is to say forwardly on to the back of the drawing.

In addition there is preferably interposed between the lens system J and the lower mirror K a system of three mirrors M, N and P, whereof the middle one N lies in a vertical plane parallel to the plane of Figure 1 and is adjustable in a horizontal direction at right angles to those planes, the mirrors M and P being inclined equally in opposite directions from the plane of Figure 1 so as respectively to deflect the light from the lens on to the mirror N and to deflect the light from the mirror N back to its original direction, namely towards the lower mirror K at the back of the housing.

The arrangement is such that the axis of the rays is the same after as before deflection by the system of three mirrors M, N and P, but the adjustment of the mirror N will serve either to lengthen or shorten slightly the total length of the path of the rays from the lens system to the back of the drawing and hence to vary the degree of magnification produced by the complete system. The arrangement thus permits of slight adjustment to ensure that the magnification produced by the optical system corresponds with the scale of the drawing.

The mirrors used are of the "surface" type, that is to say they reflect from their outer faces, and not from a deposit on the back of a glass sheet, so as to prevent distortion which would occure if normal silver-backed mirrors were used. The drawing is conveniently supported by being interposed between a fixed glass window and a removable cover of glass or other transparent material.

One or more ventilating fans Q are provided for circulating cooling air through the housing, primarily to prevent overheating of the illuminating lamps. Preferably the cooling air is confined in ducts to prevent fine dust being blown into the cabinet where it might be deposited on the mirrors.

What we claim as our invention and desire to secure by Letters Patent is:

1. Apparatus for use in shaping a plate-like blank to a predetermined edge contour, comprising a box-like support for the blank in which the blank is situated in a compartment having a front wall whereof the upper part is stepped back from the lower part, the said lower part having in it an opening giving access to the blank for shaping it with a hand tool, the step having in it a window for observation of the blank, and the upper part having means for supporting a drawing of the desired contour on an enlarged scale where an operator can readily view it while shaping the blank with the hand tool, and episcopic projection apparatus including means for highly illuminating the side of the blank remote from the operator and an optical system disposed on the remote side of the blank for projecting on to the drawing an image of the blank magnified to correspond with the drawing and superimposed thereon to enable the actual contour to be continuously compared with the desired contour.

2. Apparatus for use in shaping a plate-like blank to a predetermined edge contour, comprising a compartment having a front wall whereof the upper part is stepped back from the lower part, the said lower part having in it an opening giving access to the blank, a support for supporting the blank within the compartment in a position where it is readily accessible through said opening to a hand shaping tool, the step of the compartment having in it a window for observation of the blank, a support in said upper part of the front wall of the compartment for a drawing of the desired contour on an enlarged scale, and episcopic projection apparatus including means for highly illuminating one side of the blank, and an optical system for projecting onto the drawing an image of the blank magnified to correspond with the drawing and superimposed thereon to enable the actual contour to be continuously compared with the desired contour during the shaping operation.

GEORGE CHARLES JAMES LEGG.
WILLIAM CHARLES HERBERT CROOK.

REFERENCES CITED

The following references are of record in the file of this patent:

UNITED STATES PATENTS

| Number | Name | Date |
| --- | --- | --- |
| 1,770,659 | Oehmichen | July 15, 1930 |
| 2,064,368 | Bausch | Dec. 15, 1936 |
| 2,355,910 | Ballasch | Aug. 15, 1944 |
| 2,372,470 | Bergstrom | Mar. 27, 1945 |
| 2,439,055 | Pratt | Apr. 6, 1948 |
| 2,504,503 | De Boer | Apr. 18, 1950 |
| 2,518,252 | Reardon | Aug. 8, 1950 |